(12) United States Patent
Hao et al.

(10) Patent No.: US 9,949,170 B2
(45) Date of Patent: Apr. 17, 2018

(54) TRANSMISSION MODIFICATION

(71) Applicant: Intel Corporation, Santa Clara, CA (US)

(72) Inventors: Shun Hao, Shanghai (CN); Ren Wang, Portland, OR (US); Jr-Shian Tsai, Portland, OR (US); Alexander Min, Portland, OR (US); Roi Sadan, Aviel (IL); Jianghong Du, Shanghai (CN); Arvind Kumar, Beaverton, OR (US); Liraz Zur, Haifa (IL); Longcheng Zhu, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/021,827

(22) PCT Filed: Nov. 1, 2013

(86) PCT No.: PCT/CN2013/086417
§ 371 (c)(1),
(2) Date: Mar. 14, 2016

(87) PCT Pub. No.: WO2015/062071
PCT Pub. Date: May 7, 2015

(65) Prior Publication Data
US 2016/0227442 A1    Aug. 4, 2016

(51) Int. Cl.
*H04L 12/26* (2006.01)
*H04W 28/22* (2009.01)
(Continued)

(52) U.S. Cl.
CPC .......... *H04W 28/22* (2013.01); *H04L 1/0002* (2013.01); *H04L 1/0015* (2013.01); *H04W 4/027* (2013.01)

(58) Field of Classification Search
CPC ..... H04L 67/12; H04L 1/08; H04L 29/12707; H04L 69/22; H04W 4/027; H04W 4/008;
(Continued)

(56) References Cited

U.S. PATENT DOCUMENTS 9,271,170 B1 * 2/2016 Loverich ............. H04W 52/262
2007/0268108 A1 * 11/2007 Weinberg ............. G06F 1/3203
340/3.1
(Continued)

FOREIGN PATENT DOCUMENTS

| CN | 1744727 A | 3/2006 |
|---|---|---|
| CN | 102640536 A | 8/2012 |
| WO | 2013062388 A2 | 5/2013 |

OTHER PUBLICATIONS

International Search Report and Written Opinion for International Application PCT/CN2013/086417 dated Aug. 13, 2014, 12 pages.

*Primary Examiner* — Michael J Moore, Jr.
(74) *Attorney, Agent, or Firm* — International IP Law Group, P.L.L.C.

(57) ABSTRACT

Techniques for modifying a transmission rate of a device having a plurality of transmission rate options are described herein. The techniques include a method comprising receiving data from a sensor indicating movement of an electronic device, the electronic device having a plurality of transmission rate options. Fail ratio metrics are gathered. The fail ratio metrics indicate a ratio of failed transmissions to successful transmissions for rate option during device movement. The method includes determining whether a given rate option has a fail ratio above a predetermined threshold; and, if so, disabling the given rate option while the device is moving.

21 Claims, 4 Drawing Sheets

(51) Int. Cl.
*H04L 1/00* (2006.01)
*H04W 4/02* (2018.01)

(58) Field of Classification Search
CPC ..... H04W 4/02; H04W 4/046; H04W 72/046; H04W 84/005; H04W 84/12; H04W 12/04; H04W 48/20; H04W 4/021; H04W 4/026
See application file for complete search history.

(56) References Cited

U.S. PATENT DOCUMENTS

| | | | | |
|---|---|---|---|---|
| 2007/0293232 | A1* | 12/2007 | Nonaka | H04W 24/00 455/450 |
| 2009/0143091 | A1* | 6/2009 | Kim | H04W 52/146 455/522 |
| 2009/0303034 | A1* | 12/2009 | Abedi | G06Q 10/04 340/539.1 |
| 2010/0034106 | A1* | 2/2010 | Hu | H04L 43/0882 370/252 |
| 2013/0237204 | A1* | 9/2013 | Buck | H04M 1/72569 455/418 |
| 2014/0113662 | A1* | 4/2014 | Hasegawa | H04W 4/02 455/456.4 |
| 2014/0129175 | A1* | 5/2014 | Poduri | G01C 21/005 702/141 |
| 2014/0286213 | A1* | 9/2014 | Morrison | H04W 52/0261 370/311 |

* cited by examiner

TRANSMISSION MODIFICATION

CROSS REFERENCE TO RELATED APPLICATION

This application is a United States National Stage application of International Patent Application PCT/CN2013/086417 filed Nov. 1, 2013, the contents of which are incorporated by reference as if set forth in their entirety herein.

TECHNICAL FIELD

This disclosure relates generally to techniques for modifying transmission rates. More specifically, the disclosure describes techniques for modifying a transmission rate of a device in mobile scenarios.

BACKGROUND

With the fast growth of mobile device market, wireless communication technologies, such as Institute of Electrical and Electronics Engineers (IEEE) 802.11 wireless local area network (WLAN) have become extremely important for mobile phones, tablets, laptops, and the like. The convenience and availability of the wireless technology enable people to use their devices increasingly in mobile scenarios. When mobile, however, it is difficult to accurately predict the instantaneous wireless channel conditions due to the dynamics of its surrounding environments. A mismatch occurs between the physical layer modulation scheme (i.e., transmission rate) and channel conditions can result in frequent media access control layer frame retransmissions. This can, in turn, negatively affect the throughput performance and device energy efficiency.

DETAILED DESCRIPTION

The subject matter disclosed herein relates to techniques for modifying a transmission rate of a device in mobile scenarios. A device may communicate with a network through multiple channels each having a transmission rate. For example, a computing device may communicate wirelessly with an access point of a network using a 60 megabyte per second (Mbps) rate, a 54 Mbps rate, a 48 Mbps rate, or other rates available at a given access point. Fail ratios indicating attempted but failed transmissions are determined for each rate option. A fail ratio, as referred to herein, is the ratio of an average of attempted transmissions to the average failed transmission. The fail ratios may be used to determine which rate option to select at a given time to maximize throughput. When the computing device is moving, such as when a user carries the computing device while walking, the available rate options can fluctuate more than when the computing device is stationary. In the embodiments described herein, a computing device may modify transmission operations when a computing device is moving by disabling rates options associated with a fail ratio that is above a predetermined threshold. In embodiments, by leveraging device mobility information, system performance and user experience can be improved.

Figure 1:
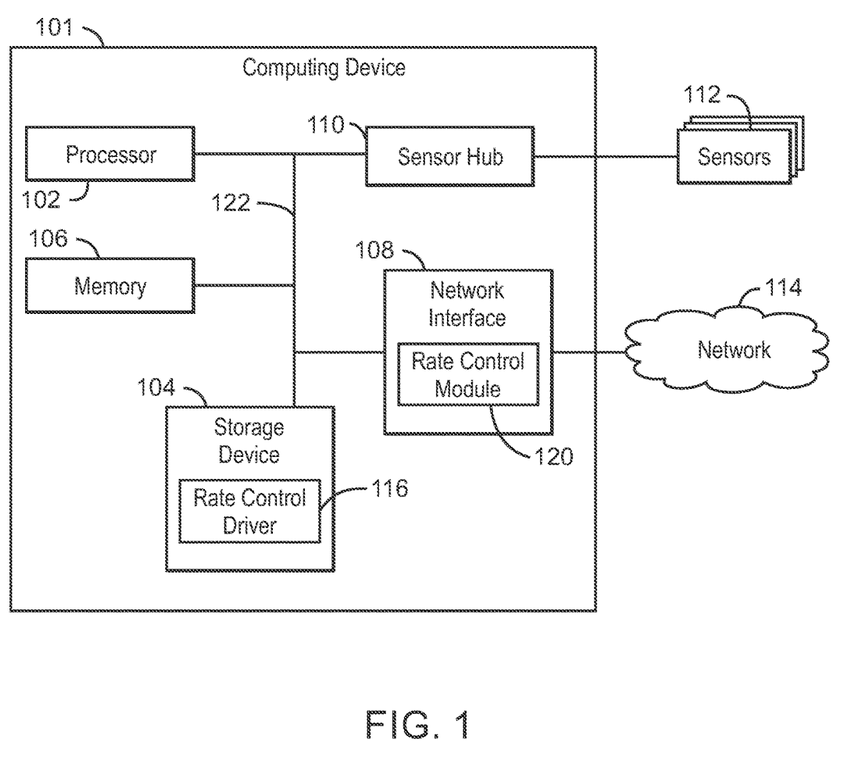
FIG. 1 is a block diagram of a computing system configured to transmit data to a network.

FIG. 1 is a block diagram of a computing system configured to transmit data to a network. The computing system 100 may include a computing device 101 having a processor 102, a storage device 104 having a non-transitory computer-readable medium, a memory device 106, a network interface 108, and a sensor hub 110 connected to one or more sensors 112. The computing device 101 may communicate, via the network interface 108, with a network 114 via one of multiple available channels wherein each channel has a given transmission rate. In embodiments, the network interface 108 may include a transceiver (not shown), or may be communicatively coupled to a transceiver to communicate to the network 114.

The storage device 104 may include a rate control driver 116. The rate control driver 116 may be implemented by any suitable hardware or combination of hardware and programming code. For example, the rate control driver 116 may be implemented in digital logic circuits, processors, or some combination thereof. In some embodiments, one or more components of the rate control driver 116 may be implemented as a general purpose processor, such as an ASIC or FPGA, executing programming code. Accordingly, a computing device operable to carry out the techniques described herein may include a processor, such as the processor 102, and a tangible, non-transitory storage medium, such as the storage device 104, for storing programming code configured to implement the techniques disclosed herein. In embodiments, a rate control module 120 may implemented as logic at least partially comprising hardware logic at the network interface 108, and may operate in conjunction with the rate control driver 116 to select a transmission channel having a given rate option. In embodiments, the rate control driver 116 may be co-located with a device driver, such as the rate control module 120, of a wireless network interface, such as the network interface 108. In embodiments, the rate control module 120 receives data from a sensor indicating movement of the device. The rate control module 120 gathers fail ratio metrics indicating a ratio of failed transmissions to successful transmissions for each rate option when the device is moving. The computing device 101, via either the rate control module 120 or the rate control driver 116, determines whether a given rate option has a failure ratio above a predetermined threshold. If the given rate option has a failure ratio above the predetermined threshold, either the rate control module 120 or the rate control driver 116, or both the rate control module 120 and the rate control driver 116 in conjunction, may direct computing device to disable the given rate option while the device is moving. Although FIG. 1 illustrates the rate control driver 116 and the rate control module 120 as distinct components of the computing device 101, the rate control driver 116 and the rate control module 120 may be combined to perform the operations of modifying transmission rate selection at a network interface card of the network interface 108, or as modules executed by the processor 102 depending on implementation.

In embodiments, the rate control driver 116, the rate control module 120, or a combination of the rate control driver 116 and the rate control module 120 may be implemented as logic, at least partially including hardware logic including a combination of hardware, software, or firmware.

For example, the rate control driver 116, the rate control module 120, or a combination of the rate control driver 116 and the rate control module 120 may be implemented as a component that includes both sensor and wireless communication modules such as the sensor hub 110. A sensor hub may include the hardware logic configured to carry out the operations discussed above. However, the logic may be disposed elsewhere within the computing device 101 or communicatively coupled to the computing device 101. In some embodiments, the rate control driver 116, the rate control module 120, or a combination of the rate control driver 116 and the rate control module 120 may be implemented partially as software, such as software that may be stored on a computer-readable media, as well as partially implemented as hardware logic. In some embodiments, the logic of the rate control driver 116, the rate control module 120, or a combination of the rate control driver 116 and the rate control module 120 may be implemented as a discrete component, or stand-alone device, or may be implemented as a system on a chip.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The main processor 102 may be connected through a system bus 124 (e.g., PCI, ISA, PCI-Express, HyperTransport®, NuBus, etc.) to the network interface 108. The network interface 108 may enable the computing device 101 to communicate, via the network 112, with the remote devices (not shown).

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
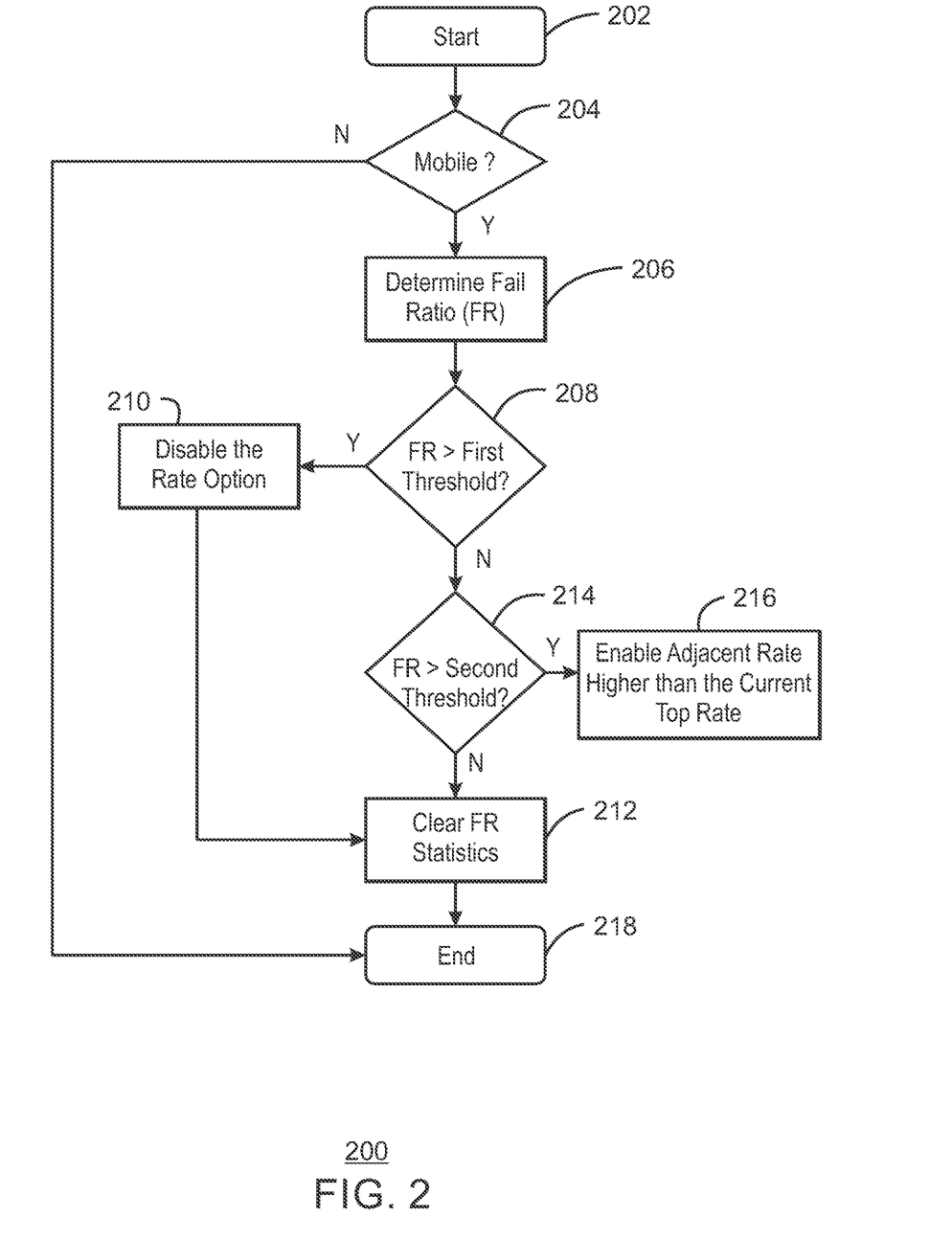
FIG. 2 is a process flow diagram illustrating modification of rate selection in a mobile scenario.

FIG. 2 is a process flow diagram illustrating modification of rate selection in a mobile scenario. A user may initiate a movement of a device, such as the computing device 101 of FIG. 1. For example, the device may be a mobile device, such as a cell phone, a smart phone, a laptop computing device, a tablet computing device, and the like, carried by the user when the user is walking. The movement may be detected by one or more sensors, such as the one or more sensors 112 of FIG. 1. The sensor hub 112 may receive raw sensor data as indicated in FIG. 2. The process 200 may begin at block 202. The rate control module 120 may determine, at block 204, that the device is moving. For example, the sensor may be an accelerometer indicating movement of the device as the device is being carried. At block 206, fail ratio metrics are gathered. The fail ratio metrics indicate a ratio of failed transmissions to successful transmissions for each rate option when the device is moving. For example, during device movement, the available rate options may include 60 Mbps channel, a 54 Mbps channel, and 48 Mbps channel. Each of the rate options is associated with a unique fail ratio. The fail ratio for 60 Mbps may be 50% indicating that for every two packets transmitted to a network via a network access point only one packet was successfully received by the network access point.

In mobile scenarios, the fail ratio of a given transmission rate option may be high enough that continuously monitoring the channel excessively consumes power and requires retransmission of packets. The rate control module 120 may determine, at block 208, if a fail ratio for a given rate option is above a first predetermined threshold. For example, the first predetermined threshold may be 25%, and a fail ratio of 50% for a given rate option will exceed the fail ratio. If the fail ratio for a given rate option is above the first predetermined threshold, the rate option is disabled at block 210. For example, if a 60 Mbps rate option has a fail rate of 50% and the first predetermined threshold is 25%, the 60 Mbps rate option will be disabled, and further fail ratio metrics will not be gathered for the 60 Mbps rate option, unless it is re-enabled as discussed below. At block 212, the fail ratio statistics may be cleared from a buffer, such as the memory device 106 of FIG. 1.

In embodiments, the fail ratio may be compared to a second predetermined threshold. The second predetermined threshold may indicate a relatively low fail ratio. For example, the second predetermined threshold may be 5%. At block 214, if the fail ratio is below the first predetermined threshold, the process 200 may determine whether the fail ratio is less than the second predetermined threshold. If the fail ratio for a given rate option is below the second predetermined ratio, the process may enable, at block 216, an adjacent rate higher than the current top rate. For example, if the 60 Mbps rate option was disabled at block 208, the next highest rate option, such as 54 Mbps, may have a fail rate below the first predetermined threshold, and below the second predetermined threshold. In this scenario, the 60 Mbps rate option may be enabled again, as it is the adjacent rate higher than the current top rate of 54 Mbps. If a given rate option is below the first predetermined threshold and above the second predetermined threshold, the process 200 may clear the fail ratio statistics as illustrated in block 212, and the process may end at block 218

In embodiments, the device may be transitioned from a mobile scenario to a stationary scenario. The gathered sensor data may indicate a reduced movement in comparison to the movement indicating mobility. Rather than determining the fail ratios for every rate option available, the rate control module 120 of the computing device 100 may select a predetermined rate option. For example, once the sensor data indicates that the device is stationary, the rate control module 120 may enable all of the available channels having rate options, and may select a predetermined rate option, such as 60 Mbps. In this scenario, the rate option may be selected based on the predetermined input from a manufacture of the device, for example. In the embodiments described, herein predetermined thresholds, and predetermined rate options, may be selected by an operator of the device, a manufacturer of the device, a user of the device, and the like.

Figure 3:
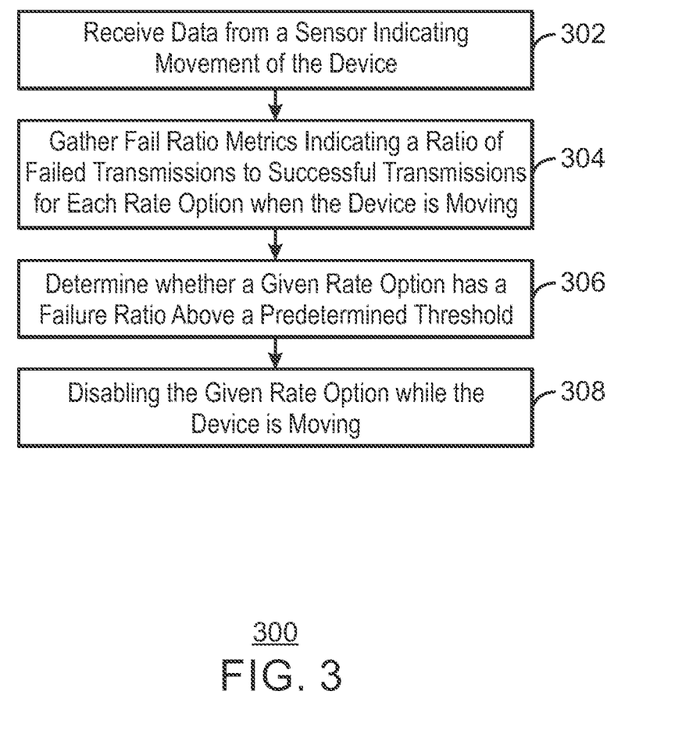
FIG. 3 is a block diagram illustrating a method for modifying a transmission rate of a device.

FIG. 3 is a block diagram illustrating a method for modifying a transmission rate of a device. At block 302, sensor data is received indicating movement of the device. At block 304, fail ratio metrics are gathered indicating a ratio of failed transmissions to successful transmissions for each rate option when the device is moving. Rather than continuing to gather fail ratio metrics, a rate option may be disabled based on whether a given rate option has a fail ratio that is determined, at block 306, to be above a predetermined threshold. If the fail ratio for a given rate option is above the predetermined threshold, then the given rate option may be disabled, at block 308, while the device is moving.

Disabling a given rate option may preserve the power of the computing device, and improve wireless transmission performance. For example, rather than continuing to gather fail ratio statistics, rate options having significantly high fail ratios may be disabled.

In embodiments, the wireless transmission may be modified when the device transitions from moving to stationary as discussed above. In embodiments, the method 300 may include selecting a rate option having a fail ratio less than a first predetermined threshold. The method 300 may re-enable a previously disabled channel when a selected channel has a fail ratio that is significantly low, indicating that adjacent channels conditions may have improved. Thus, the method 300 may include re-enabling a previously disabled channel when the fail ratio of the selected channel is below a second predetermined threshold, wherein the second predetermined threshold is lower than the first. For example, the first predetermined threshold may be a 25% fail ratio while the second predetermined threshold may be a 5% fail ratio.

Figure 4:
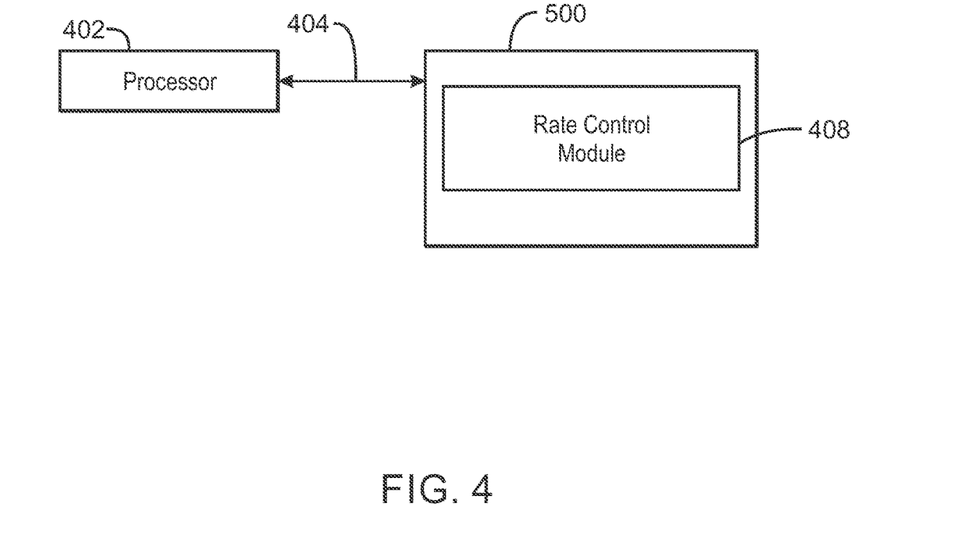
FIG. 4 is a block diagram depicting an example of a tangible, non-transitory computer-readable medium configured to modify wireless transmission operations of a device.

FIG. 4 is a block diagram depicting an example of a tangible, non-transitory computer-readable medium configured to modify wireless transmission operations of a device. The tangible, non-transitory, computer-readable medium 400 may be accessed by a processor 402 over a computer bus 404. Furthermore, the tangible, non-transitory, computer-readable medium 400 may include computer-executable instructions to direct the processor 402 to perform the steps of the current method.

The various software components discussed herein may be stored on the tangible, non-transitory, computer-readable medium 400, as indicated in FIG. 4. For example, a rate control module 408 is configured to modify wireless transmission based on sensor data indicating movement of a device. When the sensor data indicates movement, fail ratio metrics may be gathered for all available rate options, and rate options having a fail ratio above a predetermined threshold may be disabled.

Example 1

A method for modifying transmission rates is described herein. The method may include receiving data from a sensing means, such as a movement sensor, indicating movement of an electronic device, the electronic device having a plurality of transmission rate options. The movement sensor may include any means for indicating movement of the device such as a global placement sensor, a gyroscope, an altimeter, an accelerometer, an ambient condition sensor, any combination of sensors, and the like. The method may include modifying transmission rate selection based on the sensor data indicating movement of the device.

Example 2

A system for modifying transmission rates based on movement detection is described herein. The system may include a sensing means, such as a sensor to detect movement of an electronic device, and a processing means, such as a processor or microcontroller. The system may include a system memory means, such as a memory device or unit, wherein the system memory means is configured to store code to direct the processing means to receive data from the sensing means indicating movement of the electronic device. The code may direct the processing means to modify transmission rate selection based on the sensor data indicating movement of the device.

Example 3

A tangible, non-transitory, computer-readable medium is described herein. The computer-readable medium may include instructions to direct a processing means, such as a microcontroller, to receive data from a sensing means, such as a global placement system sensor, an accelerometer, a gyroscope, an altimeter, an ambient condition sensor, and the like, wherein the data received from the sensing means indicates movement of a device. The instructions may gather fail ratio metrics for rate options, and may determine whether a given rate option has a fail ratio above a predetermined threshold. If a given rate option has a fail ratio above a predetermined threshold, the instructions may direct the processing means to disable the given rate option while the device is moving.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method, comprising:
   receiving data from a sensor indicating movement of an electronic device, the electronic device having a plurality of transmission rate options; and
   modifying transmission rate selection based on the sensor data indicating movement of the device, wherein modifying the transmission rate selection comprises:
     gathering fail ratio metrics indicating a ratio of failed transmissions to successful transmissions for each rate option when the device is moving;
     determining whether a given rate option has a fail ratio above a predetermined threshold; and, if so,
     disabling the given rate option while the device is moving.

2. The method of claim 1, wherein disabling the given rate option comprises disabling a highest rate option relative to other rate options of the plurality of rate options.

3. The method of claim 1, wherein the predetermined threshold is a first predetermined threshold, the method comprising:
   selecting a rate option having a fail ratio less than the first predetermined threshold;
   determining whether the selected rate option has a fail ratio less than a second predetermined threshold; and
   enabling an adjacent rate option higher than the selected rate option such that a fail ratio may be determined for the adjacent rate option.

4. The method of claim 1, comprising:
   receiving data from a sensor indicating reduced movement of the device; and
   erasing the gathered fail ratio metrics in response to the received data indicating reduced movement.

5. The method of claim 1, wherein modifying the transmission rate selection comprises:
   receiving data from a sensor indicating reduced movement of the device;
   enabling all rate options; and
   selecting, in response to the reduced movement data received, a predetermined rate option from among the plurality of rate options.

6. The method of claim 5, wherein the predetermined rate option is selected before a rate option is selected based on gathered fail ratio metrics for each rate option.

7. A system, comprising:
   a sensor to detect movement of an electronic device;
   a processing device;
   a system memory device, wherein the system memory comprises code to direct the processing device to:
     receive data from the sensor indicating movement of the electronic device; and
     modify transmission rate selection based on the sensor data indicating movement of the device, wherein modifying the transmission rate selection comprises gathering fail ratio metrics indicating a ratio of failed transmissions to successful transmissions for each rate option when the device is moving.

8. The system of claim 7, wherein modifying the transmission rate selection comprises:
   determining whether a given transmission rate has a fail ratio above a predetermined threshold; and, if so,
   disabling the given transmission rate, such that fail ratios for the disabled transmission rate will not be determined.

9. The system of claim 7, wherein the fail ratios indicate the ratio of failed transmissions to successful transmissions for each rate available.

10. The system of claim 8, wherein the predetermined threshold is a first predetermined threshold, and wherein the system memory comprises code to direct the processing device to:
    select an available rate having a fail ratio less the first predetermined threshold;
    determine whether the selected available rate has a fail ratio less than a second predetermined threshold; and
    enable an adjacent available rate higher than the selected rate such that a fail ratio may be determined for the adjacent available rate.

11. The system of claim 8, wherein disabling the given available rate comprises disabling a highest available rate relative to other available rates of the plurality of available rates.

12. The system of claim 8, wherein modifying the transmission rate selection comprises:
    receiving data from a sensor indicating reduced movement of the device; and
    erasing the gathered fail ratio metrics in response to the received data indicating reduced movement.

13. The system of claim 8, wherein modifying the transmission rate selection comprises:
    receiving data from a sensor indicating reduced movement of the device;
    enabling all available rates; and
    selecting, in response to the reduced movement data received, a predetermined rate from among the plurality of available rates.

14. The system of claim 13, wherein the predetermined rate is initially selected before a rate option is selected based on gathered fail ratio metrics for each rate option.

15. A tangible, non-transitory, computer-readable medium comprising instructions to direct a processor to:
    receive data from a sensor indicating movement of a device;
    gather fail ratio metrics;
    determine whether a given rate option has a fail ratio above a predetermined threshold; and, if so,
    disable the given rate option while the device is moving.

16. The computer-readable medium of claim 15, comprising instructions to direct the processor to:
   receive data from a sensor indicating reduced movement of the device;
   enable all rate options; and
   select, in response to the reduced movement data received, a predetermined rate option from among the plurality of rate options.

17. The computer-readable medium of claim 16, wherein the predetermined rate option is selected before a rate option is selected based on gathered fail ratio metrics for each rate option.

18. The computer-readable medium of claim 15, wherein the predetermined threshold is a first predetermined threshold, comprising instructions to direct the processor to:
   select a rate option having a fail ratio less than the first predetermined threshold;
   determine whether the selected rate option has a fail ratio less than a second predetermined threshold indicating a relatively low fail ratio in relation to the first predetermined threshold; and
   enable an adjacent rate option higher than the selected rate option such that a fail ratio may be determined for the adjacent rate option.

19. The computer-readable medium of claim 15, wherein disabling the given rate option comprises disabling a highest rate option relative to other rate options of the plurality of rate options.

20. The computer-readable medium of claim 15, comprising instructions to direct the processor to:
   receive data from a sensor indicating reduced movement of the device; and
   erase the gathered fail ratio metrics in response to the received data indicating reduced movement.

21. The computer-readable medium of claim 15, wherein the fail ratio indicates a ratio of failed transmissions to successful transmissions for each of a plurality of rate options when the device is moving.

* * * * *